Jan. 8, 1952  E. R. McCONNELL  2,581,766
GUIDE DEVICE FOR PORTABLE POWER SAWS
Filed March 4, 1950  2 SHEETS—SHEET 1
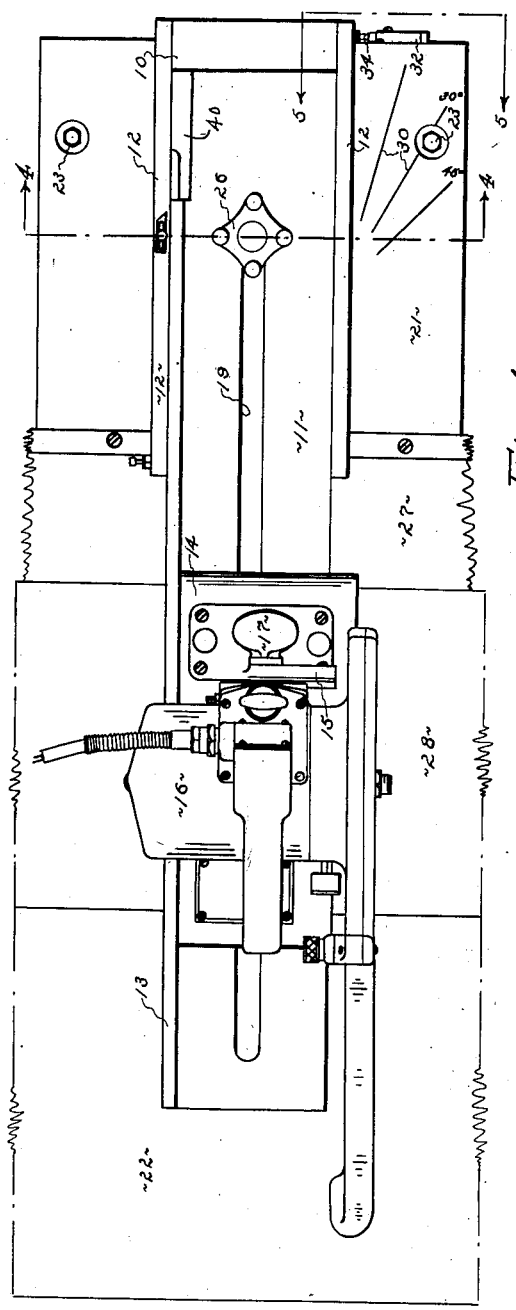
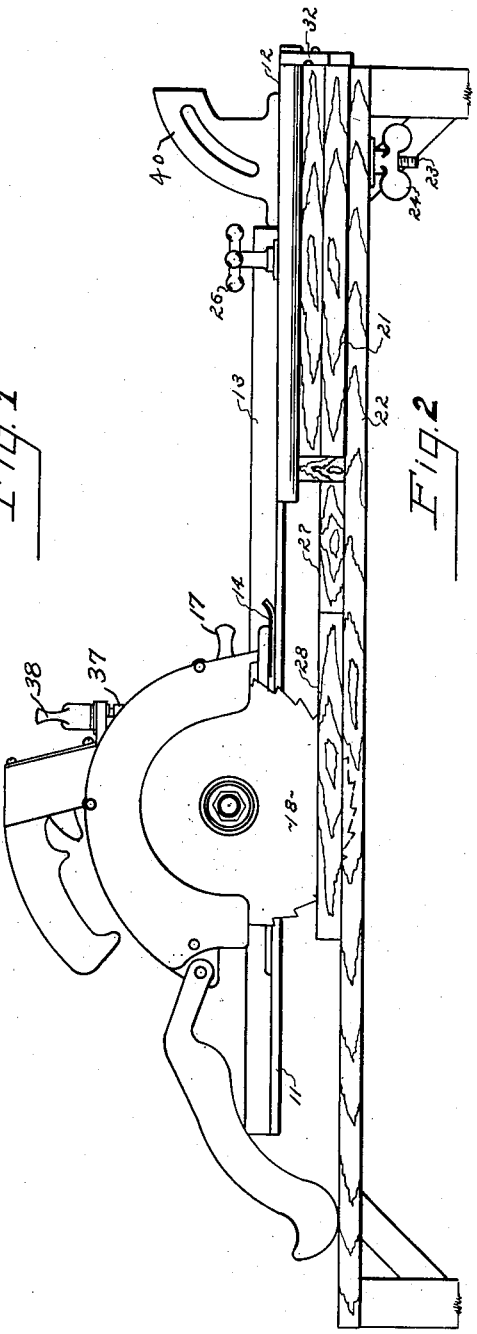
INVENTOR.
EDWARD R. McCONNELL
BY Bodell + Thompson
ATTORNEYS Jan. 8, 1952     E. R. McCONNELL     2,581,766
GUIDE DEVICE FOR PORTABLE POWER SAWS
Filed March 4, 1950     2 SHEETS—SHEET 2
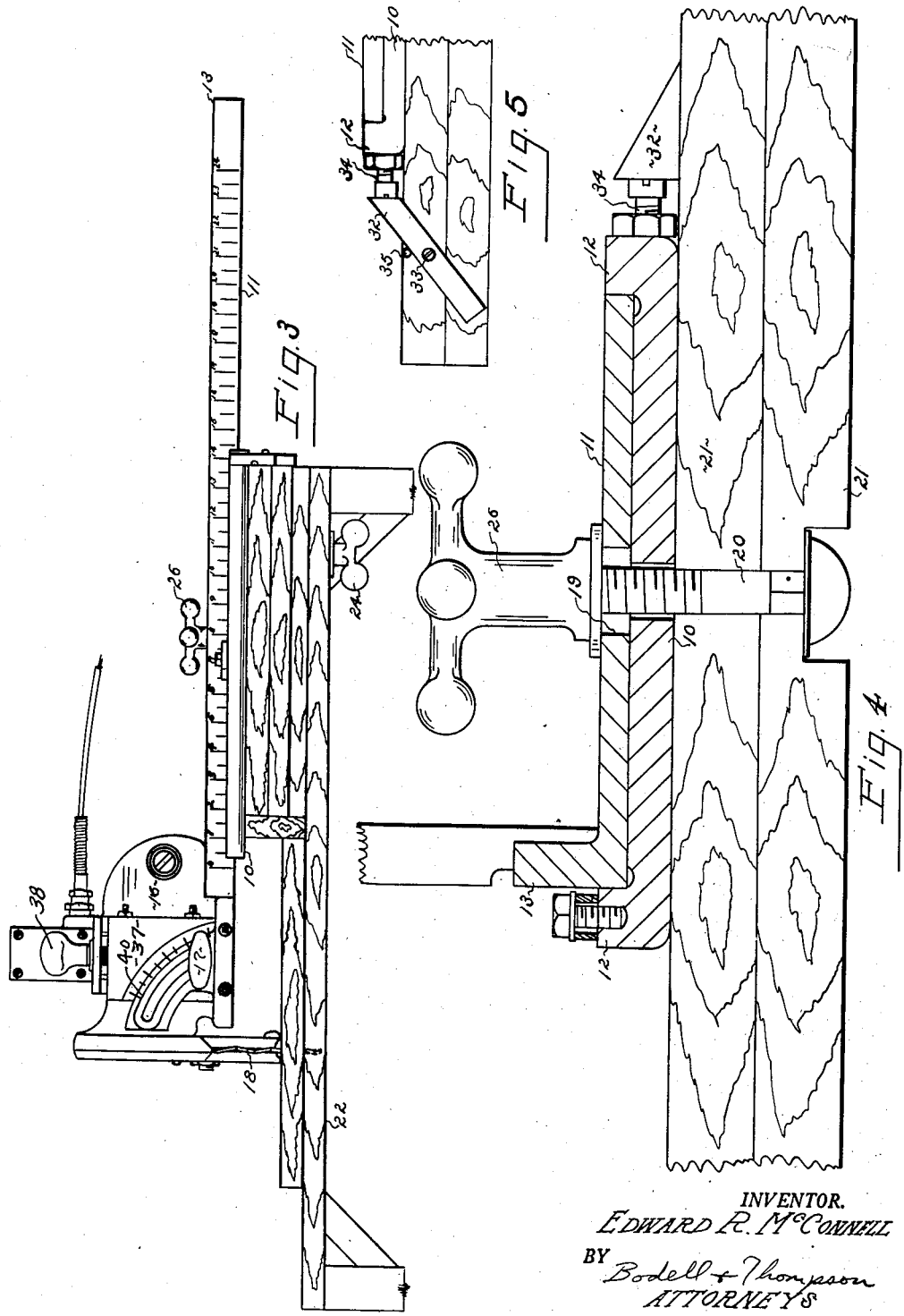
INVENTOR.
EDWARD R. McCONNELL
BY Bodell + Thompson
ATTORNEYS Patented Jan. 8, 1952

2,581,766

UNITED STATES PATENT OFFICE 2,581,766

GUIDE DEVICE FOR PORTABLE POWER SAWS

Edward R. McConnell, Syracuse, N. Y.

Application March 4, 1950, Serial No. 147,585

1 Claim. (Cl. 143—47)

This invention relates to a device for supporting and guiding a portable power operated hand saw.

Hand saws of the type referred to are now used extensively in the building trade for cutting building materials, such as wood. These saws, generally speaking, consist of a housing in which an electric motor is mounted and which is operatively connected to an arbor on which the circular saw blade, or other cutting tool, is mounted.

In many instances, it is desirable to have some means of guiding the saw during the cutting operation as, for example, when it is desired to cut material square with the edge of the material, or to cut it at an angle, or compound angle. There have been numerous devices suggested for guiding power operated hand saws and for supporting the saw in a fixed position for ripping operations. However, such devices as have been commercially used are of appreciable size and weight and accordingly, their cost prohibits their general use.

This invention has as an object a guide and supporting device of the type referred to embodying a structure having only two major parts, weighing only a few pounds, which permits the device to be manufactured and sold at a nominal price and which can be most conveniently transported to and from the job. In spite of its simplicity, light weight and low cost, the device nevertheless functions to provide an accurate guide for the saw in straight and angular cut-off operations, and a rigid support for the saw in ripping operations.

The invention consists in the novel features and in the combinations and constructions hereinafter set forth and claimed.

In describing this invention, reference is had to the accompanying drawings in which like characters designate corresponding parts in all the views.

Figure 1 is a top plan view of a device embodying my invention.

Figure 2 is a side elevational view of the device illustrating its use in cut-off operations.

Figure 3 is a side elevational view of the device illustrating its arrangement for ripping operations.

Figure 4 is a view taken on line 4—4, Figure 1.

Figure 5 is a partial end elevational view looking to the left, Figures 1 and 2.

The device consists of a base plate 10 adapted to be mounted on the top surface of a bench, table, or other support. A saw supporting plate 11 is slidably mounted upon the base plate 10. The base plate is formed with one or more guide rails, or the like, for guiding the supporting plate 11 during its movement on the base plate.

As shown in the drawings, the base plate 10 is formed with flanges 12 extending along each edge thereof and the supporting plate 11 is slidably mounted between these flanges, and is formed along one edge with an upstanding flange 13.

The plate 11 is of sufficient width to accommodate the portable power saw used with the device. A saw of the type illustrated is shown in Patent No. 1,848,330, issued to Arthur N. Emmons, March 8, 1932. The saw housing is constructed with a base plate 14 having an upstanding arcuate shaped bracket 15 detachably secured to a block slidable vertically in the saw housing 16, and is adjusted by a thumb screw 38. The bracket 15 is secured to the block 37 by a thumb screw 17 and when the thumb screw is loosened, the saw housing may be adjusted on the arcuate bracket 15 about a horizontal axis to tilt the saw blade 18 for angular cuts. The supporting plate 11 is of proper width to slidably receive the base plate 14 of the saw with the saw blade 18 spaced outwardly from the edge of the supporting plate.

The base plate 10 is formed with a central aperture and the supporting plate 11 is formed with an elongated slot 19 extending lengthwise of the plate and arranged in register with the aperture in the base plate. A clamping member extends vertically through the aperture and slot. As shown, this member may consist of a bolt 20 extending through one or more positioning blocks 21 fixedly mounted on a bench top 22 as by screws 23, the heads of which are countersunk in the top surface of the block or upper block 21, and the screws are provided with thumb nuts 24. The bolt 20 is provided with a hand nut 26 threaded on its upper end.

With this arrangement, the base plate 10 and the supporting plate 11 are adjustable about the axis of the screw 20 to position the supporting plate 11 in angular relation to a stop 27 mounted on the bench top and against which the work piece 28 is positioned. The upper surface of the block 21 may be provided with lines 30 in the form of graduations to conveniently set the device for cutting a desired angle. A stop is provided for conveniently resetting the device square with the stop 27 after the device has been positioned for an angular cut. The stop consists of a member 32 pivoted as at 33 so that one end thereof projects upwardly from the top block 21 to be engaged by a screw 34 threaded into the base plate 10, see Figure 5. The pivot 33 is positioned so that the stop member gravitates about the pivot normally positioning the upper end to be engaged by the screw 34 and is held against further pivotal movement by a pin 35. The member 32 can thus be depressed below the plate 10 to permit the same to be rotated about the clamping bolt 20.

The blocks 21 are of sufficient thickness to position the supporting plate 10 above the bench top at a height to allow for the maximum depth of cut the power saw is capable of making. If it is desired to operate on work having a thickness greater than the depth of the maximum saw cut, additional blocks 21 may be inserted under the base plate 10.

For cross cutting operations, the device is adjusted about the clamping member to obtain the desired angular cut and the plates then clamped together and to the bench by the nut 26 and the saw is moved along the supporting plate 11, being guided thereon by the upstanding flange 13.

A bracket 40 corresponding to the bracket 15 may be permanently attached to one end of the plate 11 to fixedly mount the saw on the plate with the blade 18 extending transversely thereof. With the saw mounted in this manner, the plate 11 is adjusted on the base 10 to position the saw blade a proper distance from the bench stop 27 and the plate clamped against the base member to hold the saw rigid for ripping operations, as illustrated in Figure 3.

What I claim is:

A device for supporting and guiding a portable power operated hand saw comprising a base plate adapted to be mounted on a work bench and having a guideway and a centrally arranged aperture, an elongated saw supporting plate mounted for sliding movement in a lengthwise direction in said guideway, said supporting plate being formed with a lengthwise extending slot arranged in register with said aperture and said plate being formed with an upstanding flange along one edge thereof for guiding the saw during movement thereof lengthwise of the plate, a clamping member extending vertically through the base plate and through said slot in the saw supporting plate and being operable to clamp said plates together.

EDWARD R. McCONNELL.

REFERENCES CITED

The following references are of record in the file of this patent:

UNITED STATES PATENTS

| Number | Name | Date |
| --- | --- | --- |
| 759,023 | Saunders | May 3, 1904 |
| 1,706,115 | Hannah | Mar. 19, 1929 |
| 1,836,457 | Emmons | Dec. 15, 1931 |
| 1,848,330 | Emmons | Mar. 8, 1932 |
| 1,902,270 | Tate | Mar. 21, 1933 |
| 1,960,590 | McKay | May 29, 1934 |